US008430438B2

(12) United States Patent
Murphy

(10) Patent No.: US 8,430,438 B2
(45) Date of Patent: Apr. 30, 2013

(54) SKIMMER BASKET CLEANING ROD

(76) Inventor: Michael Murphy, Neptune, NJ (US)

( * ) Notice: Subject to any disclaimer, the term of this patent is extended or adjusted under 35 U.S.C. 154(b) by 151 days.

(21) Appl. No.: 12/455,237

(22) Filed: May 29, 2009

(65) Prior Publication Data

US 2010/0303602 A1 Dec. 2, 2010

(51) Int. Cl.
*B65G 7/12* (2006.01)
*E04H 4/00* (2006.01)

(52) U.S. Cl.
USPC ............ 294/26; 294/15

(58) Field of Classification Search ............ 294/26, 294/15, 12, 18, 58; 254/131; D8/14; 248/304; 210/238, 471, 474; 15/1.7
See application file for complete search history.

(56) References Cited

U.S. PATENT DOCUMENTS

| | | | | | |
|---|---|---|---|---|---|
| 481,763 | A | * | 8/1892 | Johnson | 294/26 |
| 1,339,257 | A | * | 5/1920 | Callahan | 294/26 |
| 1,562,034 | A | * | 11/1925 | Mieher | 294/26 |
| 4,515,023 | A | * | 5/1985 | Kershner | 73/864.51 |
| D300,800 | S | * | 4/1989 | Sutphen, Jr. | D8/14 |
| 5,137,623 | A | * | 8/1992 | Wall et al. | 210/238 |
| 5,342,513 | A | * | 8/1994 | Wall et al. | 210/238 |
| D367,411 | S | * | 2/1996 | Davey | D8/14 |
| D385,076 | S | * | 10/1997 | Milbury | D34/10 |
| D442,051 | S | * | 5/2001 | Rines | D8/88 |
| 6,422,623 | B1 | * | 7/2002 | Thomas | 294/24 |
| 6,644,627 | B1 | * | 11/2003 | Forrester | 254/131 |
| 7,014,231 | B1 | * | 3/2006 | Callen | 294/24 |
| 7,309,088 | B2 | * | 12/2007 | Fiore et al. | 294/24 |
| 7,726,713 | B2 | * | 6/2010 | Oleksia | 294/24 |
| 2004/0245789 | A1 | * | 12/2004 | Berl et al. | 294/15 |
| 2009/0014613 | A1 | * | 1/2009 | Szymczak et al. | 248/304 |

* cited by examiner

*Primary Examiner* — Paul T Chin

(57) ABSTRACT

The Skimmer Basket Cleaning Rod is a dual purpose tool for both removing the skimmer plate of a pool skimmer and removal of the skimmer basket to avoid the dangers of human contact with the contents of the skimmer basket and to alleviate any bending over and kneeling on a cement surface, ending the risk of injury to back and knees. The Skimmer Basket Cleaning Rod consists of a solid aluminum rod with a handle on one end and a universal catch on the other end. The catch is designed for removing the skimmer plate through insertion into the skimmer plate hole located at its center while the opposite end is an ergonomically designed handle for ease of retrieving the skimmer plate and the skimmer basket. The Skimmer Basket Cleaning Rod is a one piece extraction devise designed to accommodate all skimmer plates and skimmer baskets for above-ground and in-ground pool skimmers.

14 Claims, 7 Drawing Sheets

300

700

SKIMMER BASKET CLEANING ROD

FIELD OF THE INVENTION

The present invention relates to a dual-purpose cleaning tool. Specifically, the invention discloses a Skimmer basket and cover removal apparatus.

BACKGROUND OF THE INVENTION

In the routine maintenance of an above-ground or in-ground pool, it is required that the skimmer basket be removed and emptied on a daily basis. The pool skimmer basket is a central repository for debris that collects on the pool water surface during pool operation. Quite often live insects including hornets, spiders, and animals such as frogs, snakes, mice, rabbits, squirrels, chipmunks, and moles, are trapped in the skimmer basket prior to the skimmer basket being removed for cleaning. The conventional way of removing the skimmer basket would be to remove the skimmer plate or cover by inserting your finger into the 1-inch hole and lifting it off and then grab the skimmer basket handle with your hand and remove it. This approach leaves the hand exposed in close proximity to and/or requires your hand to sift through the debris to find the handle, being vulnerable to a quickly escaping insect or animal and thus increases the chances of being bitten. Also, having to bend over creates another risk of potential back injury and having to kneel on the cement to remove the plate and basket can lead to throwing your back out and scraping your knees.

SUMMARY OF THE INVENTION

The foregoing and other problems are overcome and other advantages are realized, in accordance with the disclosed, alternative embodiments of these teachings. Specifically, one embodiment provides a Skimmer basket and cover removal apparatus, comprising: an elongated portion having a handle on a proximate end and a catch at a distal end; wherein the catch is adapted to fit through a Skimmer cover access hole and engage a Skimmer cover to facilitate removal of the Skimmer cover; and wherein the catch is adapted to engage a Skimmer basket to facilitate removal of the Skimmer basket.

Another embodiment provides a method for using the apparatus comprising: grasping the handle of the Skimmer basket and cover removal apparatus; engaging the Skimmer cover access hole with the angled tip in a manner to firmly grasp the Skimmer cover; removing the Skimmer cover from its initial location to thereby freely manipulate the Skimmer cover; engaging the Skimmer basket with the angled tip in a manner to firmly grasp said Skimmer basket; removing said Skimmer basket from its initial location to thereby freely manipulate said Skimmer basket; reengaging said Skimmer basket with the angled tip in a manner to firmly grasp said Skimmer basket and reposition said Skimmer basket onto its original location and reengaging said Skimmer cover with the angled tip in a manner to firmly grasp said Skimmer cover and reposition said Skimmer cover onto its original location.

BRIEF DESCRIPTION OF THE SEVERAL VIEWS OF THE DRAWINGS

The foregoing aspects and other features of the present invention are explained in the following description, taken in connection with the accompanying drawings, wherein.

To facilitate understanding, identical reference numerals have been used, where possible, to designate identical elements that are common to the figures.

DETAILED DESCRIPTION OF THE PREFERRED EMBODIMENTS

The present embodiments are primarily described within the context of a Skimmer basket and cover removal apparatus. However, those skilled in the art and informed by the teachings herein will realize that the invention is also applicable to other technical areas and/or embodiments.

In today's economy, consumers have limited budget for household expenditures leaving a negligible amount for non-essential services like pool maintenance. As such, there is a need for an easy to handle, inexpensive tool that can be used primarily to clean an in-ground or above-ground pool.

The present invention facilitates the task of cleaning a Skimmer Basket. Men, Women, and teenagers are now given the opportunity to help out when it comes to pool maintenance. The present invention provides for both the removal of the skimmer cover of a pool skimmer and the skimmer basket under minimal and controlled contact with the basket. Thus, the operator avoids the dangers of human contact with the contents of the skimmer basket. Further, the tool alleviates any bending over and kneeling on a cement surface, thereby ending the risk of injury to back and knees. The tool consists of a solid rod or elongated portion with a handle on one end (e.g., the proximate end) and a universal rubber coated flared catch on the other end (e.g., the distal end) in one embodiment. In other embodiment, a material with sufficient strength to handle the load may be utilized. The handle is ergonomically designed for ease of handling when wet. The rubber coated flared catch on the opposite end is designed to remove the skimmer plate or cover through insertion into the skimmer plate access hole located at its center allowing the rubber coating to grasp a wet skimmer basket handle to prevent slippage which may or may not be full of debris. In one embodiment, the tool is a one piece extraction devise designed to accommodate all skimmer plates and all skimmer baskets for above-ground and in-ground pools. In other embodiment, the tool may comprise one or more parts or pieces.

Figure 1:
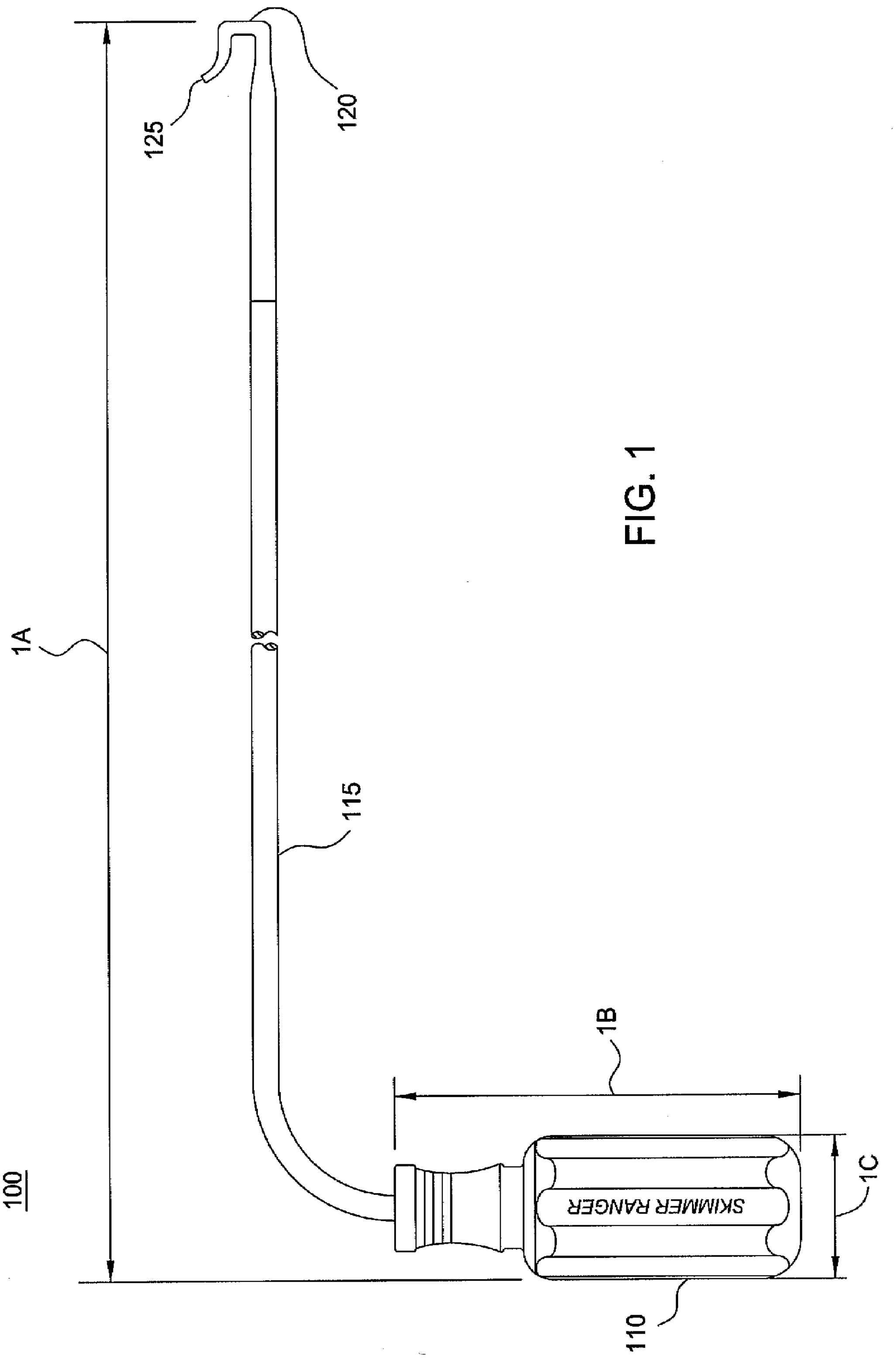
FIG. 1 graphically illustrates the in-ground version of the Skimmer Basket Cleaning Rod according to one embodiment.

FIG. 1 illustrates one embodiment of the present invention for use on in-ground pool applications. Specifically, apparatus 100 comprises a handle 110, an elongated portion or rod 115, a flared catch 120 and a tip 125. The length 1A which is 36 inches has been specifically designed to accommodate an average height person, in the execution of this task. In other embodiments, the length may be adjusted to suit specific configurations. A ¼ inch aluminum round-bar 115 has been used for strength and lightweight. In other embodiments, elongated portion 115 may be ½ inch or other suitable dimensions.

The ergonomic plastic handle 110 allows the user to have a firm yet comfortable grip on the devise if wet. The width 1C is 1⅙th inch and the length 1B is 3¾th inches. The width and length have been designed specifically to allow all shapes, and sizes of hands to easily utilize this device. In other embodiments, these dimensions may be adjusted to suit specific configurations.

Figure 2:
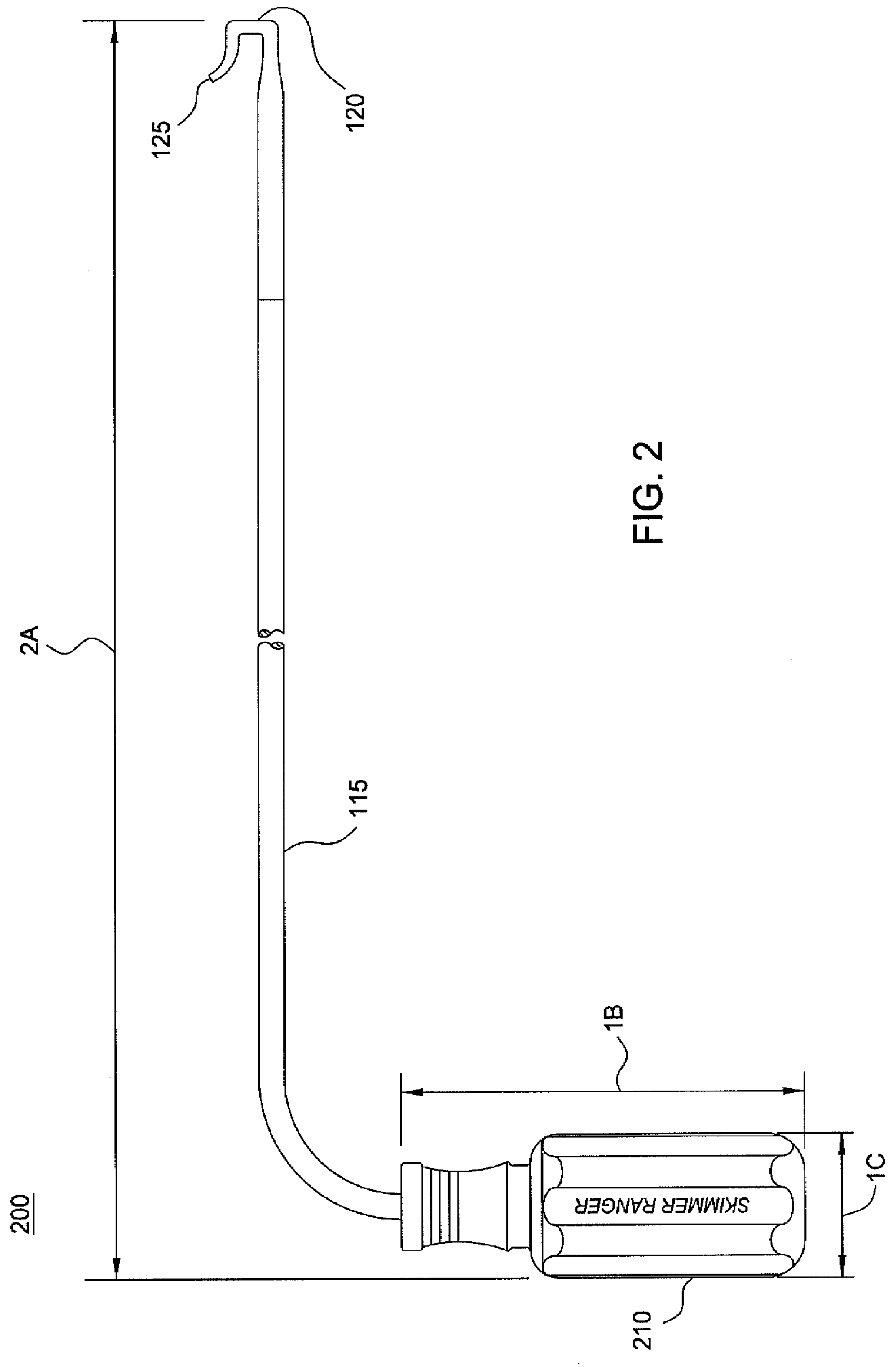
FIG. 2 graphically illustrates the above-ground version of the Skimmer Basket Cleaning Rod according to one embodiment.
Figure 3:
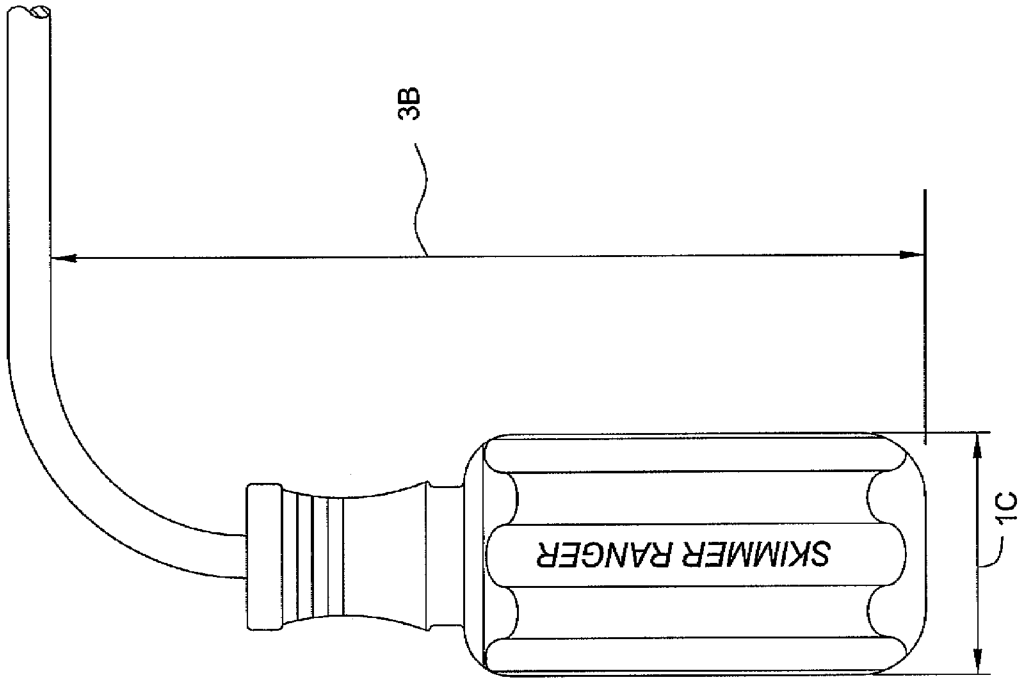
FIG. 3 graphically depicts the handle dimensions according to one embodiment.

FIG. 2 illustrates a shorter embodiment of subject invention for use on above-ground pool applications. The length 2A which is 16 inches has been specifically designed to ease the use of this devise when executing this task. In other embodiments, the length may be adjusted to suit specific configurations. A ¼ inch aluminum round-bar 215 has been used for strength and lightweight. In other embodiments, elongated portion 215 may be ½ inch or other suitable dimensions.

Figure 4:
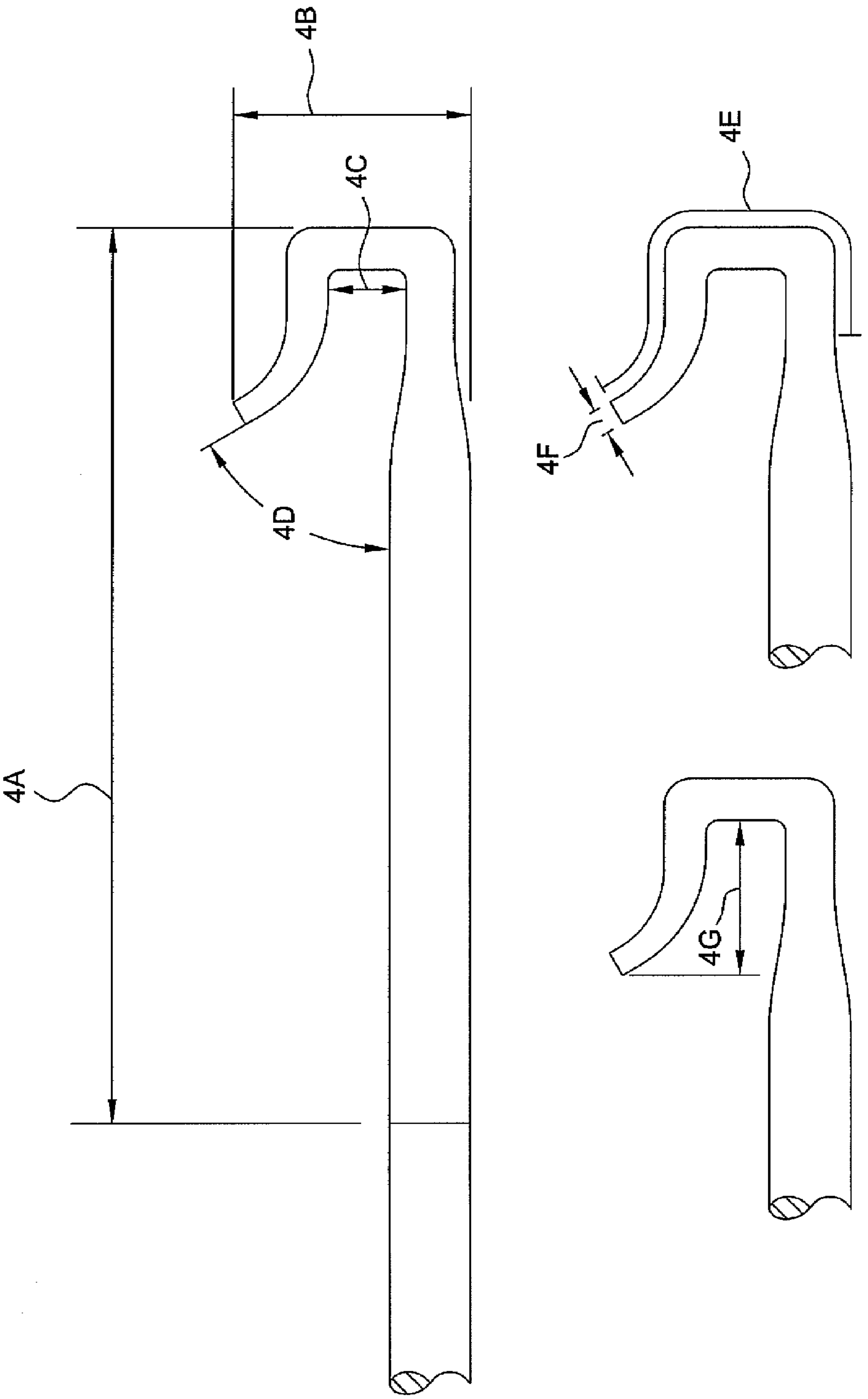
FIG. 4 graphically depicts the length of the rubber coating applied to the catch according to one embodiment.

FIG. 4 illustrates the rubber coated flared catch on the opposite end of the tool. The length of rubber coating 4E is about 3 inches in one embodiment. In other embodiments the length is adjusted according to specific configurations. The tool has a rubber coating to prevent slippage and firmly grasp a wet and debris filled skimmer basket handle for ease of removal. This end of the devise is brightly colored to allow it to be easily seen when inserting through debris to hook the handle on the basket for removal.

The outer width of the catch 4B is ⅞ inch in one embodiment. The standard size skimmer plate hole is 1 inch. This width allows ease of insertion through skimmer plate hole. In other embodiments the length is adjusted according to specific configurations.

The length of the angle or the tip of the catch 4F is ⅜ inch in one embodiment. It maintains an acute angle, preferably 60 degree outer angle 4D which allows the user to remove any skimmer plate or skimmer basket on the market. This allows the tool to slip underneath a handle application that may be folded over or a shorter handle that is only connected to ¼ of the basket. The point of this is a flat-tip, is like a screwdriver, not sharp, as it may appear. In other embodiments the length and angle are adjusted according to specific configurations.

The depth of the catch 4G is ¾ inch in one embodiment. The depth of the catch enables the tool to easily catch the underside of the skimmer plate and to easily grasp the skimmer basket handle. In other embodiments the depth is adjusted according to specific configurations.

The inside width of the catch 4C is ¾ inch in one embodiment. The inside width of the catch enables the tool to easily catch the underside of the skimmer plate and to easily grasp the standard ¾ inch wide skimmer basket handle. In other embodiments the width is adjusted according to specific configurations.

The Skimmer Basket Cleaning Rod is the only one piece skimmer cover and skimmer basket remover on the market.

Figure 6:
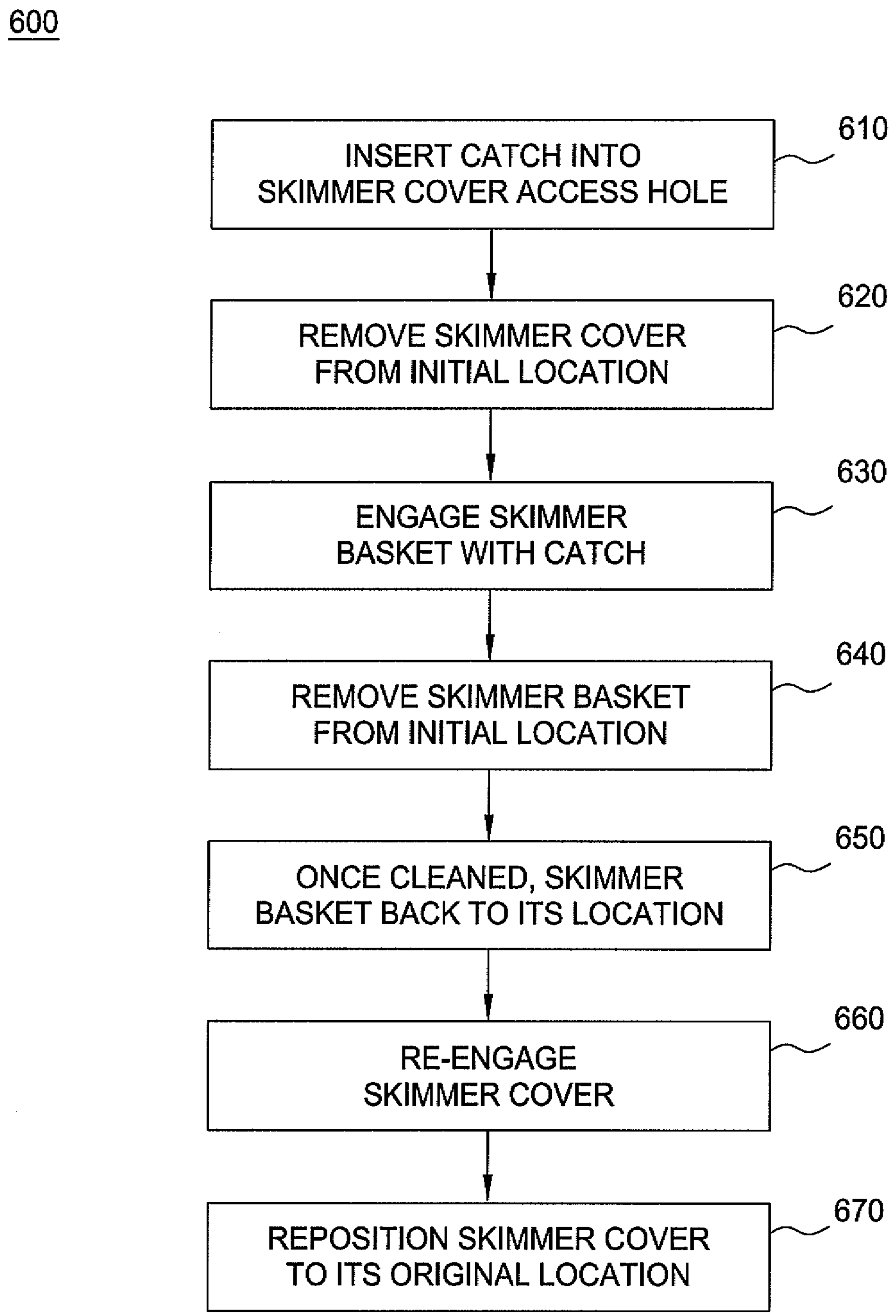
FIG. 6 depicts a flow diagram of a method for using the Skimmer basket and cover removal according to one embodiment.

FIG. 6 depicts a flow diagram of a method for using the Skimmer basket and cover removal according to one embodiment.

Figure 5:
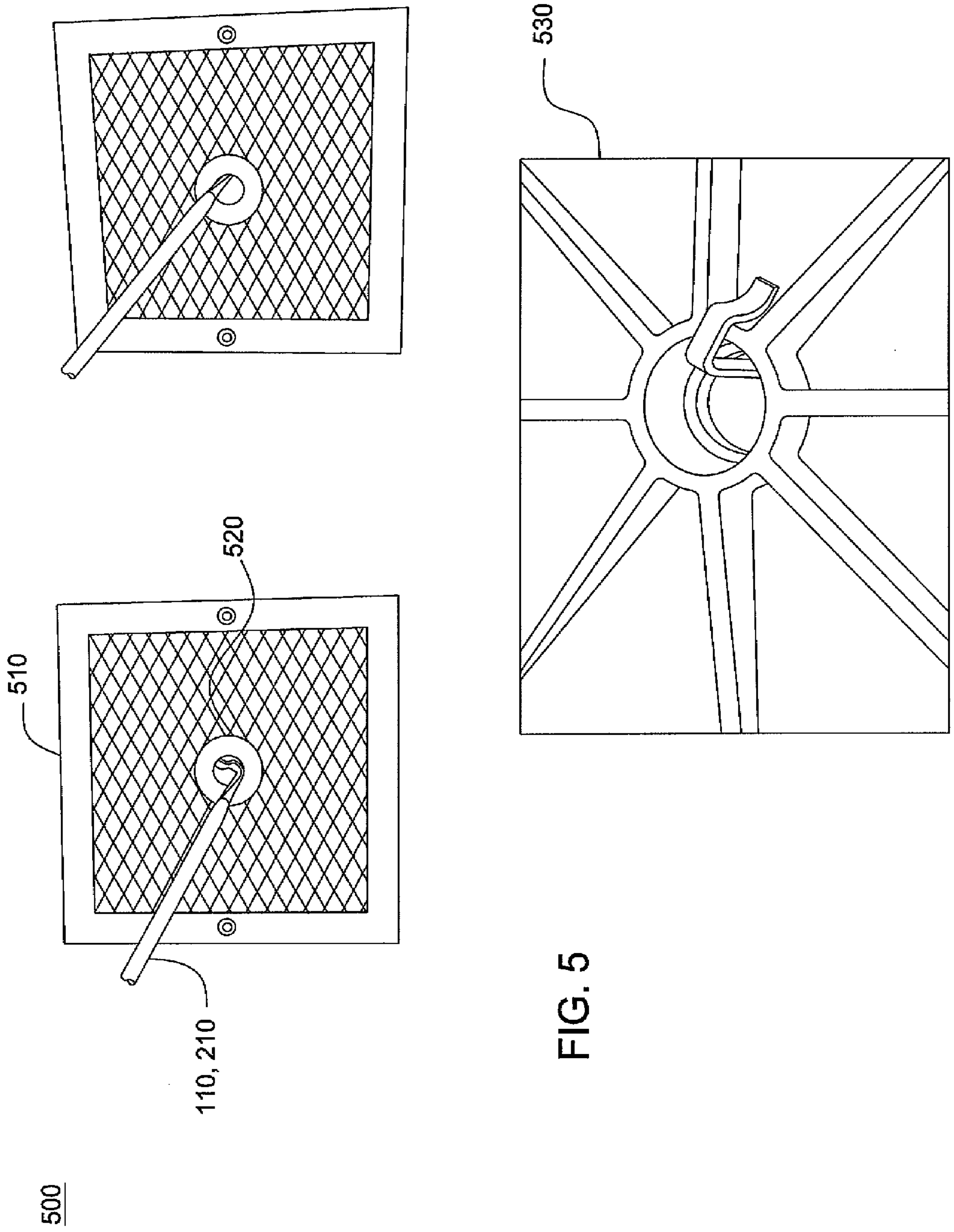
FIG. 5 graphically depicts the method of using the Skimmer basket and cover removal according to one embodiment.
Figure 7:
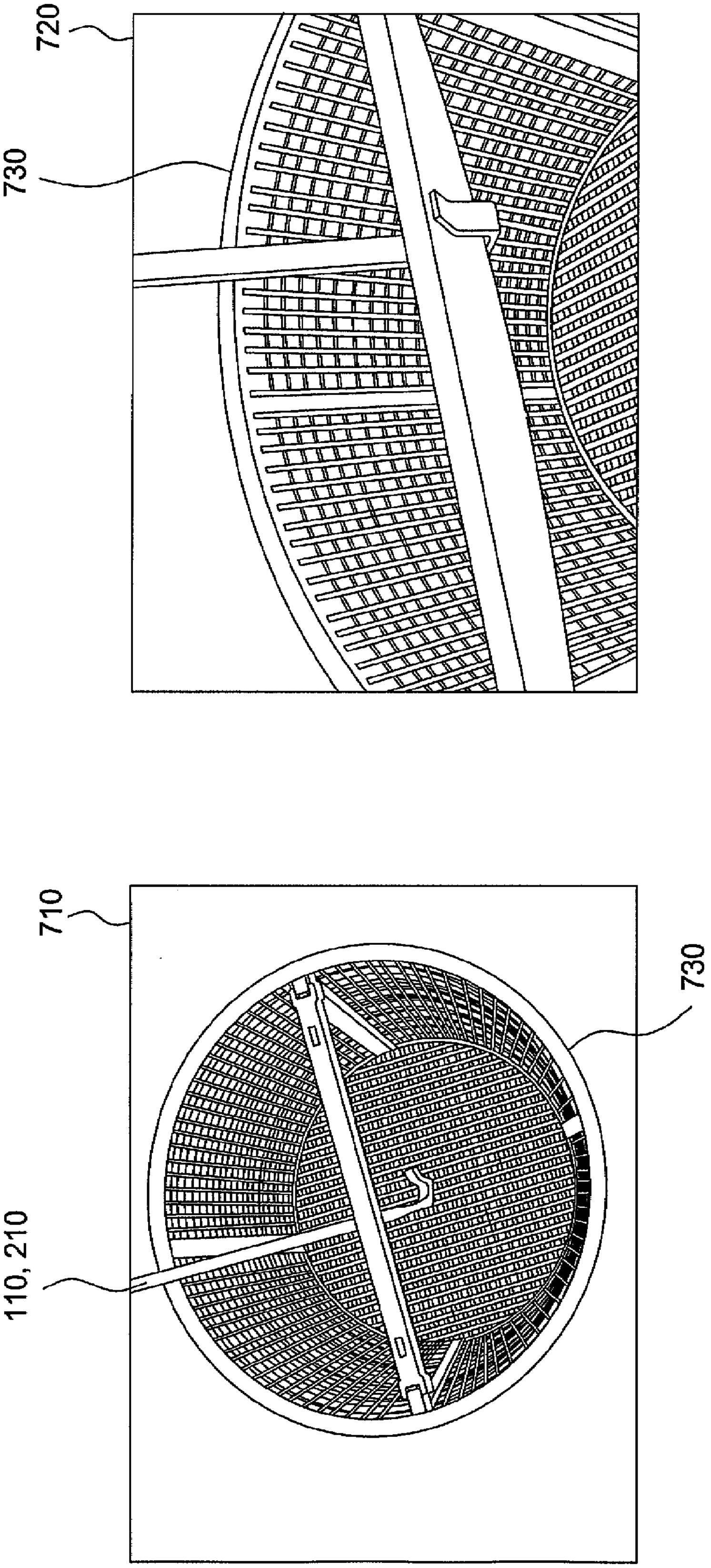
FIG. 7 graphically illustrates the method of using the Skimmer basket and cover removal according to one embodiment.

The method 600 is entered at step 610 where the catch is inserted into the Skimmer cover access hole as illustrated in FIGS. 5, 520 and 530. At step 620, the Skimmer cover is removed from its initial location. At step 630, the Skimmer basket is engaged with the catch as illustrated FIG. 7, 710, 720. At step 640, the Skimmer basket is removed from its initial location. At step 650, once cleaned the Skimmer basket is repositioned to its initial location. At step 660, the Skimmer cover is reengaged through the access hole as in step 610. At step 660, the Skimmer cover is repositioned to its original location.

While the foregoing is directed to various embodiments of the present invention, other and further embodiments of the invention may be devised without departing from the basic scope thereof. As such, the appropriate scope of the invention is to be determined according to the claims, which follow.

The invention claimed is:

1. A pool Skimmer basket and cover removal apparatus, comprising:

an elongated portion having a proximate end handle and a distal end catch, said catch comprising an inside portion adapted to engage a pool Skimmer basket, and a flared tip associated with an acute arcuate section adapted to guide said pool Skimmer basket toward the inside portion;

wherein the catch is adapted to fit through a Skimmer cover access hole and engage a Skimmer cover to facilitate removal of the Skimmer cover; and wherein the catch is adapted to engage the Skimmer basket to facilitate removal of the Skimmer basket.

2. The apparatus of claim 1, wherein the elongated portion is a metal rod, which is at least 0.25 inch.

3. The apparatus of claim 1, wherein the elongated portion is at least 16 inches in length.

4. The apparatus of claim 1, wherein the handle is substantially perpendicular to the elongated portion.

5. The apparatus of claim 4, wherein the handle is at least 4 inches long.

6. The apparatus of claim 1, wherein the catch is angled in a manner adapted to engage the Skimmer basket handle.

7. The apparatus of claim 6, wherein the acute angle is disposed with respect to the elongated portion.

8. The apparatus of claim 1, wherein the handle is a hand grip.

9. The apparatus of claim 1, wherein said catch has associated with it an inside width defining a distance between said flared tip and said elongated portion.

10. The apparatus of claim 1, wherein said inside width of said catch is approximately ¾ inch.

11. The apparatus of claim 1, wherein said catch has associated with it an outer width defining a distance between an end of said flared tip and said elongated portion.

12. The apparatus of claim 1, wherein said outer width of said catch is approximately ⅞ inch.

13. The apparatus of claim 1, wherein said catch has associated with it a depth defining a distance between an end of said flared tip and an inner portion of said catch.

14. The apparatus of claim 1, wherein said depth of said catch is approximately ¾ inch.

* * * * *